United States Patent
Cote et al.

(10) Patent No.: US 6,708,957 B2
(45) Date of Patent: Mar. 23, 2004

(54) MOVING AERATOR FOR IMMERSED MEMBRANES

(75) Inventors: Pierre Cote, Dundas (CA); Steven Pedersen, Burlington (CA); Denis Guibert, Hamilton (CA)

(73) Assignee: Zenon Environmental Inc., Oakville (CA)

( * ) Notice: Subject to any disclaimer, the term of this patent is extended or adjusted under 35 U.S.C. 154(b) by 0 days.

(21) Appl. No.: 10/105,843

(22) Filed: Mar. 25, 2002

(65) Prior Publication Data

US 2002/0139748 A1 Oct. 3, 2002

Related U.S. Application Data

(63) Continuation-in-part of application No. 09/814,737, filed on Mar. 23, 2001, now Pat. No. 6,550,747, which is a continuation-in-part of application No. 09/488,359, filed on Jan. 19, 2000, now Pat. No. 6,245,239, which is a continuation of application No. PCT/CA99/00940, filed on Oct. 7, 1999.
(60) Provisional application No. 60/278,005, filed on Mar. 23, 2001, provisional application No. 60/103,665, filed on Oct. 9, 1998, and provisional application No. 60/116,591, filed on Jan. 20, 1999.

(30) Foreign Application Priority Data

| Jan. 14, 1999 | (CA) | ............................................. | 2258715 |
| Jul. 20, 1999 | (CA) | ............................................. | 2278085 |
| Jul. 30, 1999 | (CA) | ............................................. | 2279766 |

(51) Int. Cl.$^7$ ................................................ B01F 3/04
(52) U.S. Cl. ................ 261/23.1; 261/81; 261/87; 261/124; 210/636; 210/644; 210/321.67
(58) Field of Search ...................... 261/23.1, 28, 122.1, 261/122.2, 124, 81, 87, 93; 210/636, 641, 644, 649, 650, 651, 652, 138, 142, 321.67, 321.75, 321.78, 321.79, 321.84, 321.88

(56) References Cited

U.S. PATENT DOCUMENTS

| 3,622,132 | A |  | 11/1971 | Rawlings, Jr. |
| 3,920,186 | A |  | 11/1975 | Crandall |
| 3,989,627 | A |  | 11/1976 | Crandall |
| 4,294,696 | A |  | 10/1981 | Thayer |
| 4,688,519 | A | * | 8/1987 | Fischer |
| 4,820,457 | A |  | 4/1989 | Jager |
| 4,870,018 | A |  | 9/1989 | Lehmann |
| 5,192,456 | A |  | 3/1993 | Ishida et al. |
| 5,480,553 | A | * | 1/1996 | Yamamori et al. |
| 5,482,625 | A |  | 1/1996 | Shimizu et al. |
| 5,639,373 | A | * | 6/1997 | Mahendran et al. |
| 5,906,774 | A |  | 5/1999 | Loy |
| 5,944,997 | A |  | 8/1999 | Pedersen et al. |
| 6,245,239 | B1 | * | 6/2001 | Cote et al. |
| 6,280,626 | B1 | * | 8/2001 | Miyashita et al. |
| 6,319,411 | B1 | * | 11/2001 | Cote |
| 6,550,747 | B2 | * | 4/2003 | Rabie et al. |
| 2001/0027951 | A1 | * | 10/2001 | Gungerich et al. |
| 2003/0079876 | A1 | * | 5/2003 | Underdown |

FOREIGN PATENT DOCUMENTS

| EP | 0 937 494 A2 | 8/1999 |
| JP | 60025591 A | 2/1985 |
| JP | 01148397 A | 6/1989 |
| JP | 04250898 A | 9/1992 |
| JP | 04265128 A | 9/1992 |
| JP | 05220363 A | 8/1993 |
| JP | 07185271 | 7/1995 |
| JP | 08215549 A | 8/1996 |
| JP | 08 323 161 | 12/1996 |
| JP | 09225272 A | 9/1997 |
| JP | 11000534 A | 1/1999 |
| WO | WO 97/06880 | 2/1997 |
| WO | WO 00/21890 | 4/2000 |

* cited by examiner

*Primary Examiner*—Scott Bushey
(74) *Attorney, Agent, or Firm*—Andrew Alexander

(57) ABSTRACT

One or more aerators move below an area of an assembly of immersed filtering membranes to be aerated. The movement can take various forms including the sweep of a pendulum. Positions in the assembly of membranes may be alternately aerated for a period of time and then not aerated for a period of time.

19 Claims, 7 Drawing Sheets

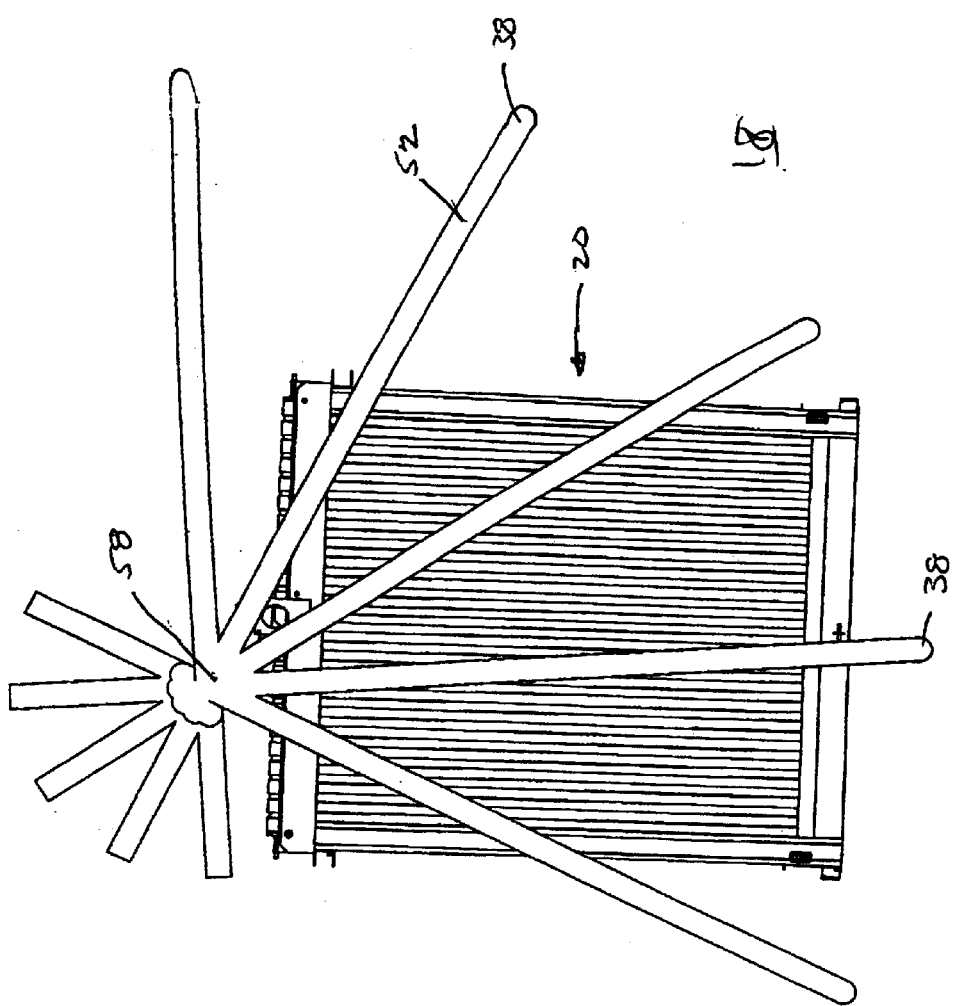

MOVING AERATOR FOR IMMERSED MEMBRANES

This is a non-provisional of U.S. provisional application No. 60/278,005 filed Mar. 23, 2001 and a continuation-in-part of U.S. application Ser. No. 09/814,737 filed Mar. 23, 2001 now U.S. Pat. No. 6,550,747. U.S. Ser. No. 09/814,737 is a continuation-in-part of U.S. application Ser. No. 09/488,359 filed on Jan. 19, 2001 and issued as U.S. Pat. No. 6,245,239 which is a continuation of PCT/CA1999/00940 filed Oct. 7, 1999 and published as WO 00/21890. The entirety of all of the documents described above are incorporated into the present document by this reference.

FIELD OF THE INVENTION

This invention relates to aerators for inhibiting fouling of immersed filtering membranes.

BACKGROUND OF THE INVENTION

Aeration is used with immersed membranes to scour the membranes and to disperse areas of tank water having increased concentrations of rejected solids from near the membranes. In particular, immersed membranes in bioreactors quickly become surrounded in sludge if intensive course bubble aeration is not provided.

U.S. Pat. Nos. 5,192,456 and 5,482,625, issued on Mar. 9, 1993 and Jan. 9, 1996 to Kubota Corporation, describe an air diffuser disposed below a set of membrane cartridges. A casing surrounds the air diffuser and the membrane cartridges, extending vertically from the bottom of the diffuser to the top of the membrane cartridges. In commercial embodiments, the diffuser is located about 1 m below the membrane cartridges and the diffusers provide a relatively small number of holes per square meter of horizontal cross-sectional area of the assembly of membrane cartridges. Air is supplied such that the air velocity and pressure loss through the holes of the diffusers is sufficient to prevent water or sludge from creeping into the holes of the diffuser. The casing and location of the diffuser below the membrane cartridges encourages the bubbles to become evenly dispersed by the time that they reach the membrane cartridges. The shroud and deep aerators increase both the equipment cost and the energy required to produce bubbles.

Another approach is described in U.S. Pat. No. 5,944,997, issued on Aug. 31, 1999 to Zenon Environmental Inc. In this patent, aerators are located directly below a set of membrane modules and no shroud is used but there are many more holes—about 150 holes per square meter of horizontal cross-sectional area of the assembly of membrane modules. Although the large number of holes provides well distributed bubbles, the air flow per hole is not sufficient to prevent tank water or sludge from creeping into the aerators around the perimeter of the holes. To prevent this tank water from leaving deposits in the aerator, the aerators are periodically flushed with a two-phase mixture of air and permeate. Although effective, this method involves an extensive grid of aerators to provide the large number of holes and additional equipment for flushing the aerators.

SUMMARY OF THE INVENTION

It is an object of the present invention to improve on the prior art. This object is met by the combination of features, steps or both found in the claims. The following summary may not describe all necessary features of the invention which may reside in a sub-combination of the following features or in a combination with features described in other parts of this document.

In one aspect, the invention provides one or more aerators that move below an area to be aerated. The movement can take various forms such as a horizontal back and forth motion, rotation in a generally horizontal plane about a generally vertical axis or the sweep of a pendulum.

In one embodiment, the one or more aerators move at such a speed that it has substantially the equivalent effect of continuous aeration although bubbles may not be provided to a selected position for periods of up to a few seconds.

In another embodiment, each position within the range of area aerated by the one or more aerators experiences a pattern of air flow that alternates between an air-on condition and an air-off condition such that each position has aerated periods of time and a non-aerated periods of time. Such an aerator encourages transient flow to persist in the tank water which reduces the size of any dead zones in the membrane assembly and enhances the fouling inhibiting effect of aeration.

The minimum aerated period of time for each position may be about 0.5 seconds or more. The maximum non-aerated period of time for each position may be about 60 seconds or less or between about 15 to 30 seconds.

The air flow through each aerator hole may be sufficient to substantially prevent tank water from creeping into the aerator and yet aerate every position in the range of movement of the aerator with minimal submergence of the aerator. The number of holes may be about 50 or less, preferably 25 or less, per square meter of the horizontal area of membrane assembly to be aerated. With reasonable amounts of total airflow (averaged over time and the area to be aerated), the airflow through each hole can be made sufficiently large to keep tank water from creeping into the holes of the aerators.

BRIEF DESCRIPTION OF THE DRAWINGS

Preferred embodiments of the present invention will now be described with reference to the following figures.

FIGS. 4A, 4B and 5 are side views of other reactors with moving aerators.

DETAILED DESCRIPTION OF EMBODIMENTS

Figure 1:
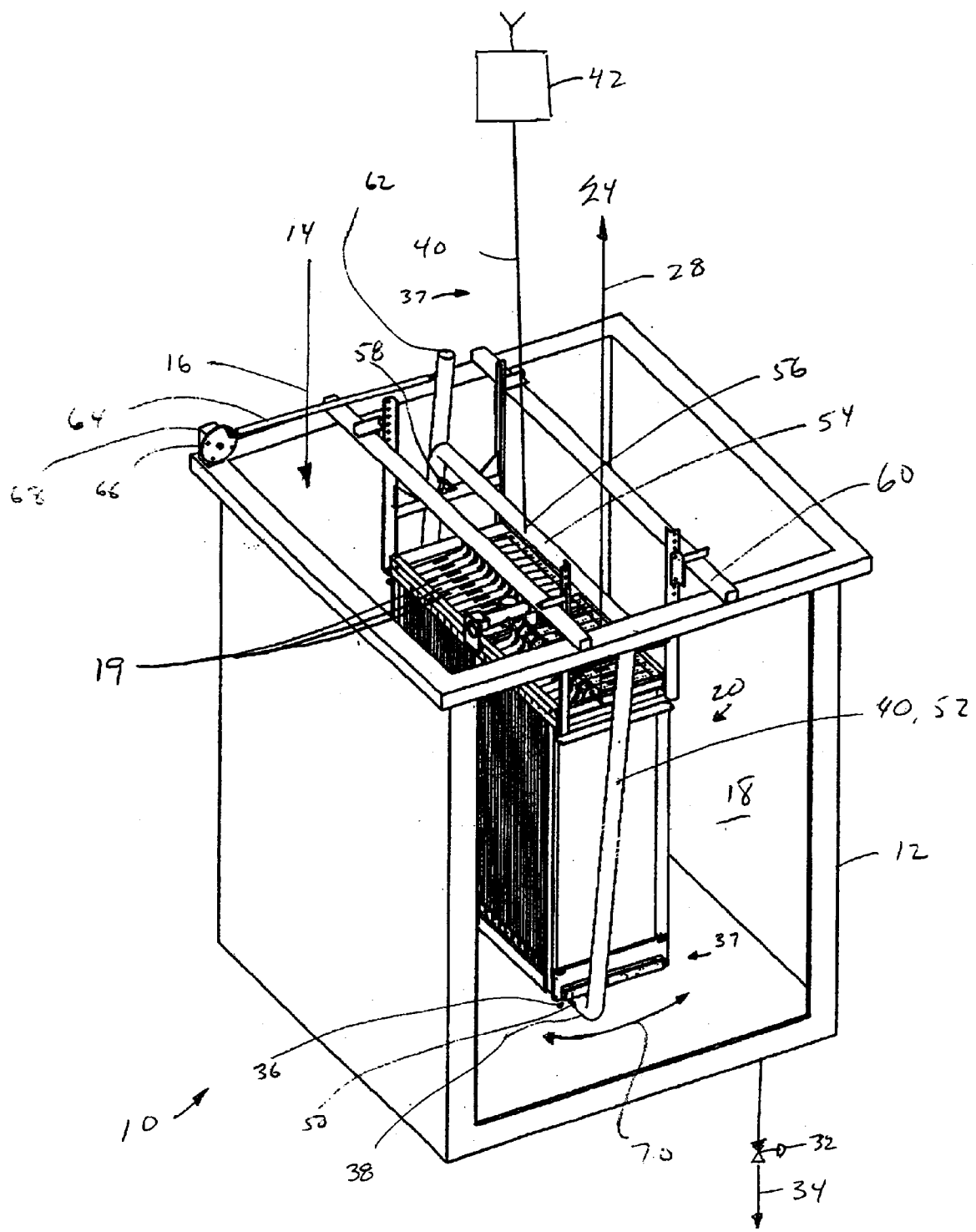
FIG. 1 is an isometric representation of a reactor with an assembly of membranes and a moving aerator.
Figure 2:
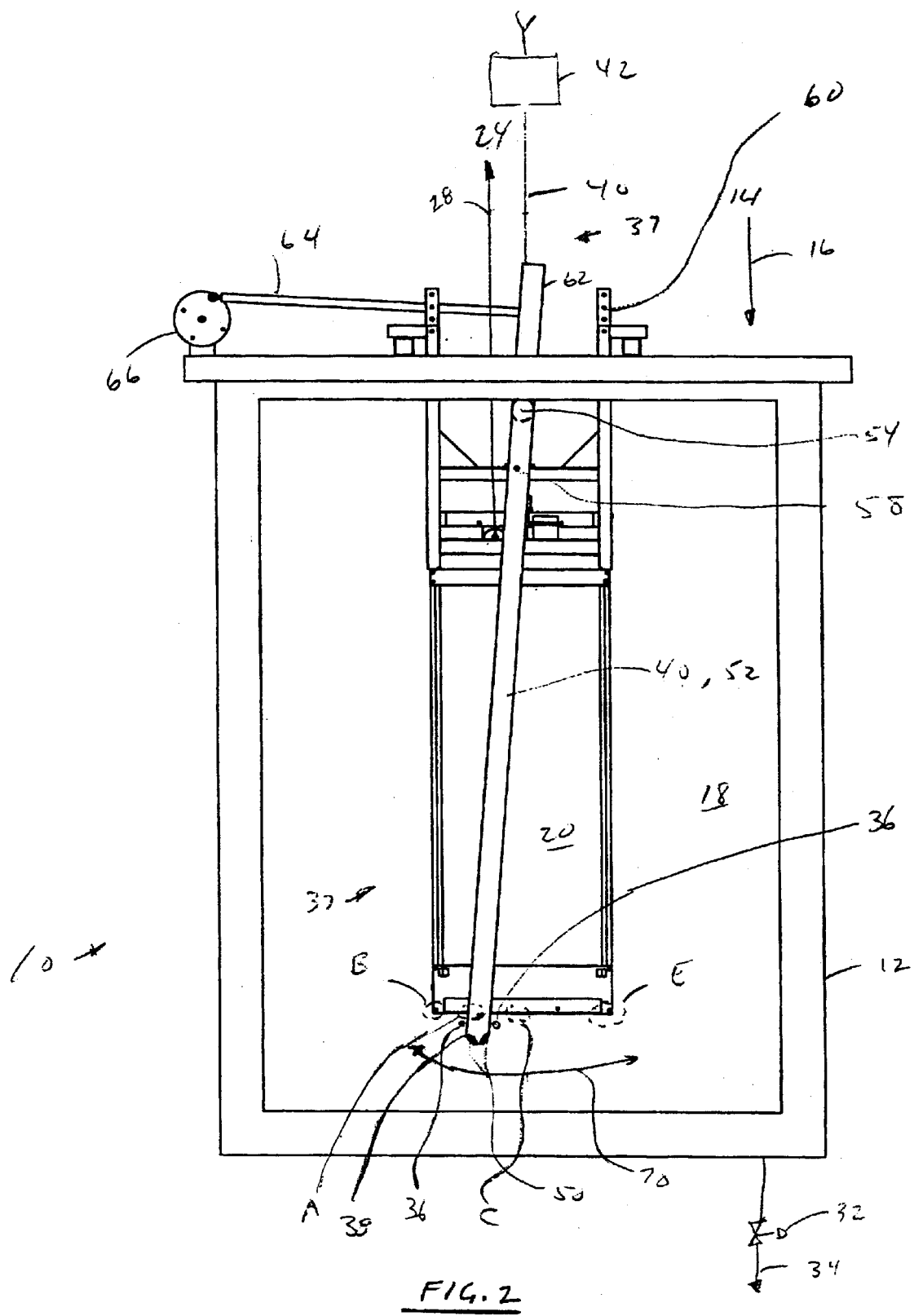
FIG. 2 is a side view of the reactor of FIG. 1.
Figure 3:
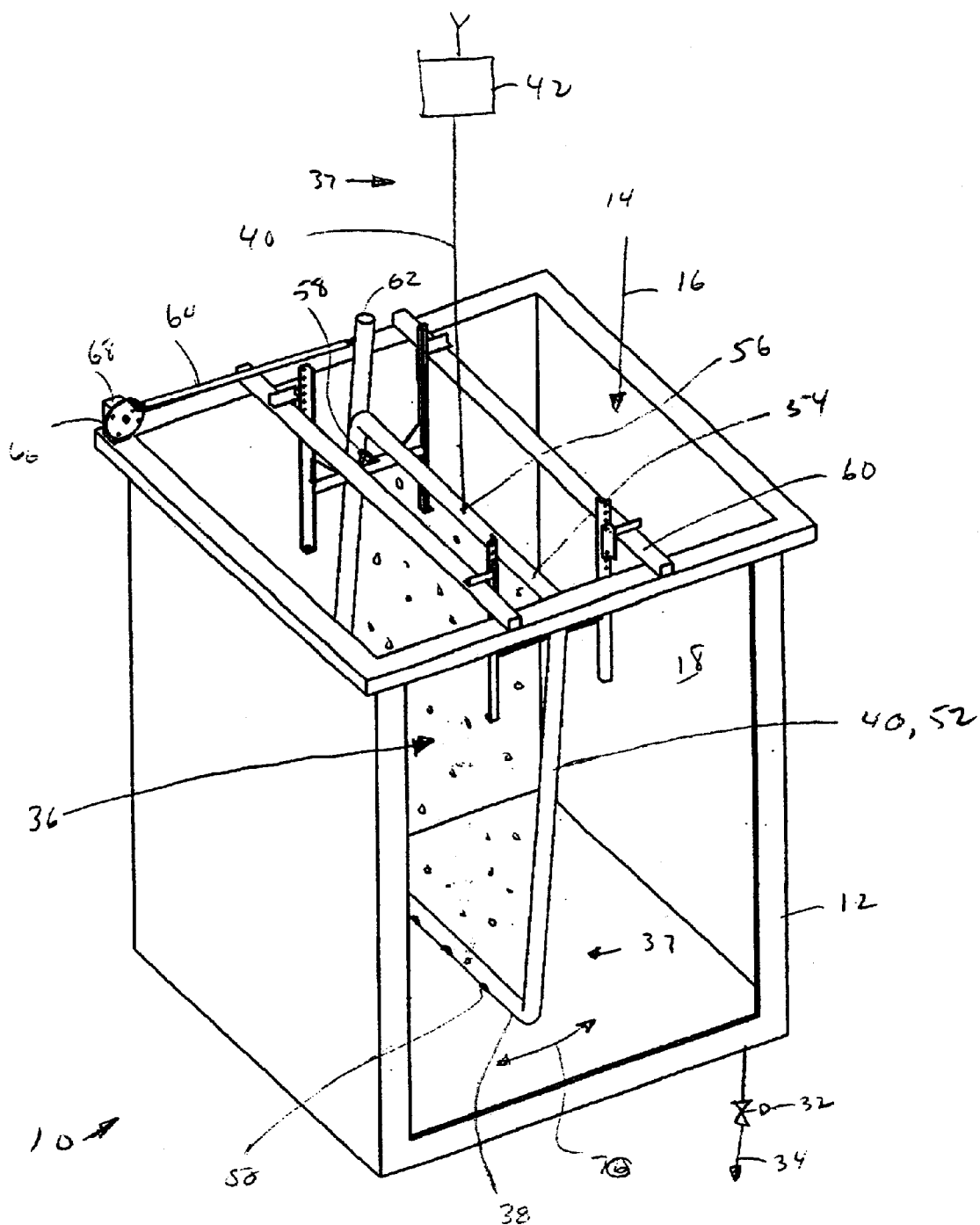
FIG. 3 is an isometric representation of the reactor of FIG. 1 with the membrane assembly removed.

Referring to FIGS. 1–3, a reactor 10 has a tank 12 which may be filled with feed water 14 through an inlet 16. The tank 12 is illustrated with a glass front to show the components within. The feed water 14 may contain microorganisms, suspended solids or other matter which will be collectively called solids. Once in the tank, the feed water 14 becomes tank water 18 which may have increased concentrations of the various solids, particularly if the reactor 10 is used to treat wastewater. The terms feed water 14 and tank water 18 are used loosely and the embodiments may also be used with other liquids.

A membrane assembly 20 is mounted in the tank. The membrane assembly 20 may be subdivided into several elements 19. The membranes in the assembly 20 typically have a pore size in the microfiltration or ultrafiltration range, preferably between 0.003 and 10 microns. Membrane assemblies 20 are available in various sizes and configurations. For example, the membranes may be hollow fibres potted in one or more headers. The hollow fibre membranes typically have an outside diameter between 0.4 mm and 4.0 mm and are potted at a packing density between 10% and 40%. The hollow fibre membranes are typically between 400 mm and 1,800 mm long and mounted with between 0.1% and 5% slack. In FIG. 1, hollow fibre membranes are arranged into rectangular skeins and oriented generally vertically. Alternatively, the membranes may be of other configurations such as flat sheets which are typically oriented vertically in a spaced apart pair as is known in the art.

During permeation, the tank 12 is kept filled with tank water 18 above the level of the membranes in the membrane assembly 20. Filtered permeate 24 flows through the walls of the membranes under the influence of a transmembrane pressure. The transmembrane pressure is preferably created by creating a partial vacuum in a permeate line 28 connected to the interior of the membranes. The transmembrane pressure may vary for different membranes and different applications, but is typically between 1 kPa and 150 kPa. Permeate 24 may also be periodically flowed in a reverse direction through the membrane assembly 20 to assist in cleaning the membranes.

During permeation, the membranes reject solids which remain in the tank water 18. These solids may be removed by a number of methods including digestion by microorganisms if the reactor 10 is a bioreactor and/or by periodically or continuously removing a portion of the tank water 18 by opening a drain valve 32 in a drain conduit 34 at the bottom of the tank.

An aeration system 37 has an aerator 38 connected by an air delivery system 40 to an air source 42, which is typically one or more air blowers which supply a substantially continuous flow of air. The word air is used loosely and other gases may be used. The aeration system 37 produces bubbles 36 in the tank water 18. The aerator 38 may be of various types, for example, it may be a conduit aerators made of holes 50 drilled in a conduit such as a tube. The holes 50 may be drilled through the bottom half of the conduit to force the bubbles 36 to disperse into a wider bubble plume. The bubbles 36 are preferably made of air but may be made of other gasses such as oxygen or oxygen enriched air if required.

The bubbles 36 agitate the membranes which inhibits their fouling or cleans them. In addition, the bubbles 36 rise in a plume, decrease the local density of tank water 18 above the aerator 38 and create an air-lift effect causing tank water 18 to flow upwards past the membrane assembly 20. The bubbles 36 typically burst at the surface and do not generally follow the tank water 18 back downward.

The bubbles 36 typically have an average diameter between 5 and 150 mm. Individual large bubbles 36 are believed to be more effective in cleaning or inhibiting fouling of the membranes 6, but smaller bubbles 36 are more efficient in transferring oxygen to the tank water 18, if desired.

The size of the holes 50 is chosen in consideration of a number of factors. Firstly, the size of the holes 50 is consistent with the desired size of bubbles 36. The size of the bubbles 36 is primarily related to the size of the holes 50, the air flow rate through each hole 50, effects created by movement of the aerator 38 and the depth of submergence of the holes 50. Factors which produce a desired size of bubble 36 are known in the art. If the aerators 38 are located near the bottom of a large tank 12, such as those used in municipal treatment works, an aerator 38 with holes 50 of between 5 mm and 15 mm typically produces bubbles 36 of an acceptable size. Secondly, the holes 50 are made large enough not to be plugged by trash in the tank water 18 when air flow is stopped for maintenance etc. The size of trash is a function of pre-screening but holes 50 of 5 mm in diameter or larger are sufficient with typical pre-screening. Thirdly, the maximum holes 50 size is chosen to provide a good distribution of air flow among the various holes 50. In a conduit aerator, this is achieved by providing the conditions of a "short manifold" in which sufficient pressure builds up within the pipe to even out the airflow per hole 50. Satisfactory conditions are typically achieved when the total area of the holes 50 divided by the cross section of the conduit, squared, is less than about 0.5. Fourthly, the holes 50 may optionally be made small enough so that the velocity of the air flow through them is able to substantially prevent tank water 18 from creeping into the holes 50. This is achieved when the pressure drop through the holes 50 is higher than the maximum range of amplitude of a pressure wave created by the formation of the bubble. However, a lower pressure drop which allows some tank water 18 to creep into the holes 50 may also be used where the tank water 18 does not significantly foul the holes 18 or the aerators 38 are kept clean by flooding, flushing or other cleaning techniques. In some cases, maintaining sufficient airflow through the holes 50 to prevent tank water 18 from creeping in may be more costly that an alternate design having less total air flow and employing regular aerator cleaning and in some cases the reverse may be true. A 1 to 3 kPa pressure drop across the holes 50 is typical.

As suggested above, the hole size, number of holes 50, air flow through each hole 50, the geometry of the aerator 38, the total air flow per aerator 38, the number of aerators 38 and a desired total system air flow to the area of the membrane assembly 20 to be aerated are all related. Thus an acceptable design is typically achieved by an iterative method. To the factors already described can be added the following. The total air pressure supplied (relative to atmospheric pressure) to the aerators 38 is typically determined by the head of water at the depth of submergence of the aerators 38 (approximately 10 kPa per meter) plus an additional pressure required to get the desired rate of air flow through the holes 50 of the aerator 38. This additional pressure may optionally be chosen to exceed, when measured in units of depth of a column of tank water 18, the maximum height of the interior of the aerator 38 and the pressure drop required through the holes 50 to substantially prevent tank water 18 from creeping into the holes 50. Further, the total system air flow to the area of the membrane assembly 20 to be aerated is preferably related to a desired the "superficial velocity". The superficial velocity is defined as the rate of air flow to all aerators 38 serving a portion (which may be all) of a membrane assembly to be aerated divided by the horizontal area of that portion. Superficial velocity is preferably between 0.01 m/s and 0.15 m/s depending primarily on the fouling characteristics of the tank water 18. Typically, a successful aerator 38 has about 50 or less, more typically 25 or less, holes 50 per square meter of the horizontal area of the portion (which may be all) of the membrane assembly 20 to be aerated by the aerator. The movement of the aerators 38, discussed below, may also be considered as part of the process of selecting the aerator 38 geometry, the number of holes 50 and other aspects of the design of the aeration system 37 discussed above.

Still referring to FIGS. 1 through 3, the air delivery system 40 includes an aerator 38, down-tubes 52 and a header 54 connecting the down-tubes 52 to an inlet 56. The down-tubes 52 suspend the aerator 38 from pivots 58 located on a suspension frame 60 which also holds the membrane assembly 20. The pivots 58 are located above the highest expected surface of the tank water 18 which keeps them drier and increases the length of the down-tubes 52 so as to produce more nearly horizontal motion of the aerator 38. Although in this embodiment the down-tubes 52 both support the aerators 38 and provide a conduit for air flow, separate support and air flow pieces could be used. Similarly, other methods of mounting a moving aerator 38, including methods wherein the aerator 38 is separate from the membrane assembly 20 could be devised.

An arm 62, which may be a sealed extension of a down-tube 52, extends above the tank 12. A rod 64 connects the arm 62 to a wheel 66 driven by a motor 68. As the motor 68 turns, the arm 62 and thus the aerator 38 are rocked back an forth. The dimensions of the wheel 66, arm 62 and down-tube 52 in relation to the pivot 58 and the point where the rod 64 attaches to the arm 62 are chosen such that the aerator 38 sweeps through an arc 70 sufficient to aerate substantially the entire footprint of the membrane assembly 20. Aeration at the ends of the membrane assembly 20 may be enhanced by making the travel of the aerator 38 extend past the membrane assembly 20 by a small amount to aerate the outsides of the membrane assembly 20. Similarly, holes 50 may be drilled beyond the sides of the membrane assembly 20 to better aerate the outsides of the membrane assembly 20. The aerator 38 may be weighted to have approximately neutral buoyancy to reduce stress on the various drive components.

A revolution of the wheel 66 produces on complete movement of the aerator 38, meaning a movement from an initial position and direction of travel back to the same position and direction of travel. This movement is repeated with each subsequent revolution of the wheel 66. If other motions of the aerator 38 are desired, the wheel 66 may be replaced by a slotted cam which interacts with a follower at the end of the rod 64, the vertical motion of the rod 64 being restrained. Alternately, the motor 68 may be a stepper motor operated at a varying rotational velocity or other mechanisms may be used. With alternate means for moving the aerator 38, the linear velocity of the aerator 38 may be made more nearly constant.

The resulting cyclical movement of the aerator 38 causes substantially every position in the range of movement of the aerator 38 to be aerated. Depending on the speed of the aerator 38, the resulting effect may be substantially the same as continuous aeration even though a selected position may not receive bubbles 36 for up to a few seconds. At other, typically slower speeds, most positions will be alternately aerated for a period of time and then not aerated for a period of time and the effects of cyclic aeration as described in WO 00/21890, incorporated herein by this reference, can be achieved to varying extents. In particular, the inventors have observed that as the bubbles 36 from the aerator 38 pass a portion of the membrane assembly 20, transient horizontal flows in the tank water 18 are created. This is most apparent visually when a conduit aerator 38 oriented parallel to the elements 19 passes from one side of an element 19 to the other. As the aerator 38 passes, tank water 18 flows first to one side of the element 19 and then the other, but at different times for different heights above the aerator 38. The membranes can be seen swaying vigorously as the aerator 38 passes them.

Because the characteristics of the movement of the aerator 38 vary across its travel, a selection of positions may be analyzed. For example, position B is at the end of the range of travel of the aerator 38. Position C is in the middle of the range of travel of the aerator 38. The aerator 38 passes position C twice as often as it passes position B. Accordingly, position C experiences aeration relatively frequently but for relatively brief periods of time compared to position B. Thus for each position, the duration of the aerated period of time and the non-aerated period of time may differ. In a position such as position A, there may be two distinct non-aerated periods of time.

The aerator 38 and its movement may be made such that the minimum aerated period of time for each position is about 0.5 seconds or more. To increase the aerated period of time, the speed of the aerator 38 may be reduced or the width, in the direction of the aerator's travel, of the plume of bubbles 36 from the aerator may be increased. The plume of bubbles can be made wider by increasing the airflow through the holes 50, by locating the holes 50 at the bottom of the aerator 38 or by using an aerator 38 with holes 50 located further apart in the direction of the travel of the aerator 38. The plume of bubbles 36 is typically 10 to 30 cm wide.

The aerator and its movement may also be made such that the maximum non-aerated period of time for each position is about 60 seconds or less. For example, the maximum non-aerated period of time for each position may be between about 15 to 30 seconds which is achieved in the embodiments of FIGS. 1–3 by having the wheel 66 turn at 2 to 4 rpm. To reduce the maximum non-aerated period of time, the aerator 38 may be moved more quickly, the plume of bubbles 36 may be made wider or wide, composite or multiple aerators 38 may be used as will be described below.

Figure 4A:
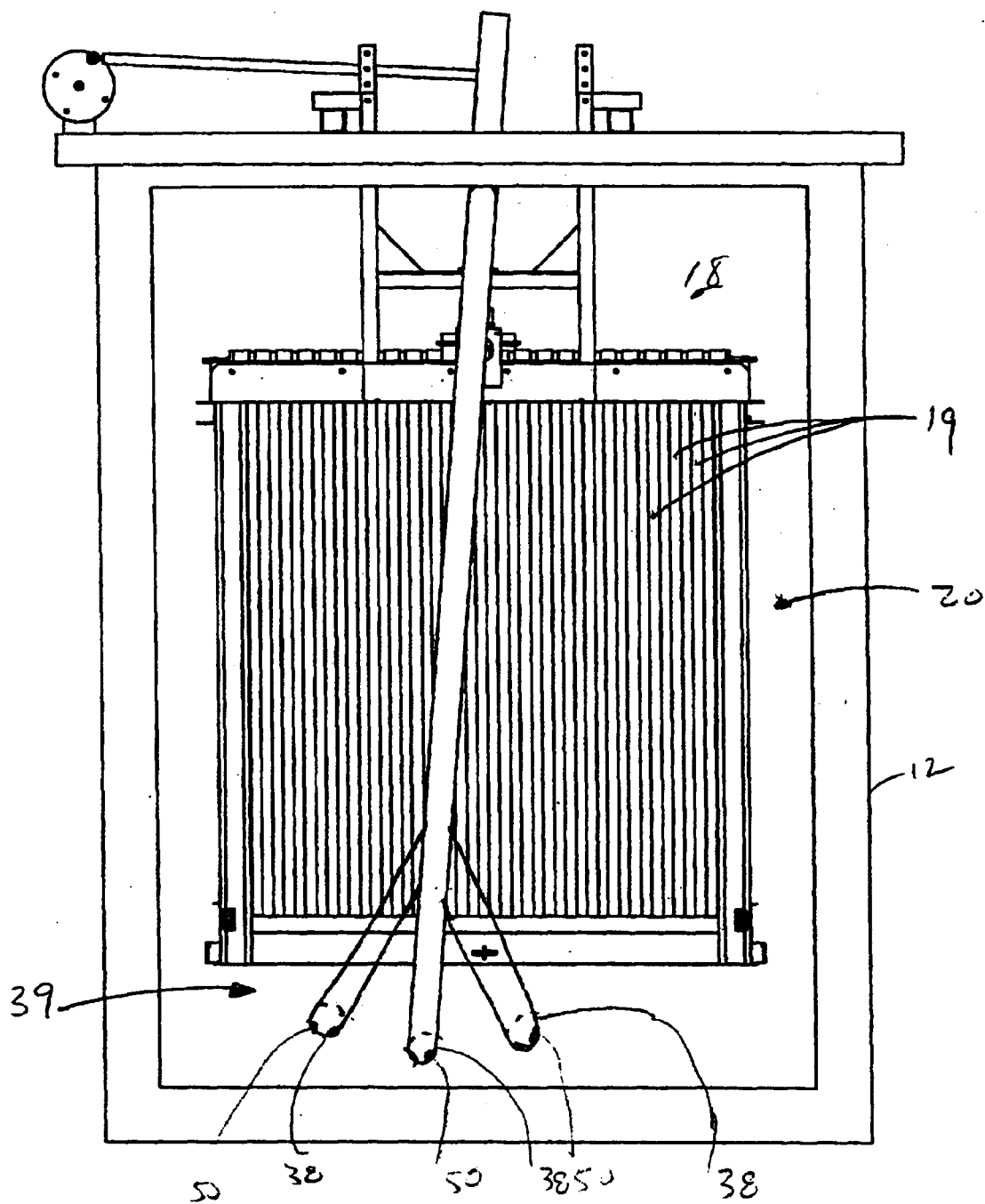

Referring to FIG. 4A, a wide or composite aerator assembly 39 may be used. For example, the aerator assembly 39 illustrated has three aerators 38. For the same speed and area aerated, making the aerator assembly 39 wider increases the aerated period of time and reduces the non-aerated period of time. Such an aerator assembly may be used with a wide, measured in the direction of travel of the aerators 38, membrane assembly 20.

Figure 4B:
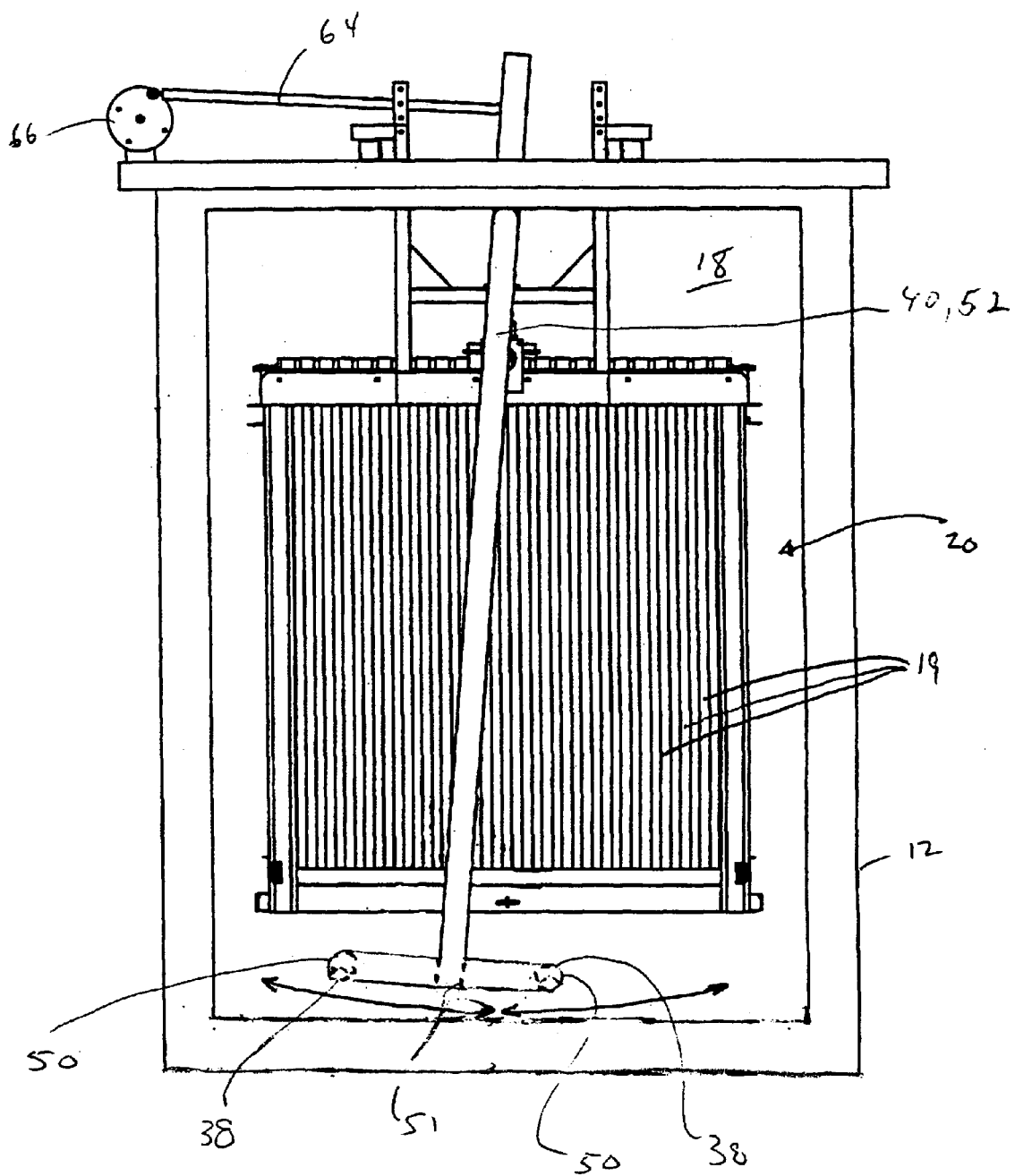

Referring to FIG. 4B, two distinct aerators 38 are used to service a membrane assembly 20 which is wide in the direction of travel of the aerators. In this configuration, each aerator 38 produces a distinct plume of bubbles 38 which moves under only one half of the membrane assembly 20. With this arrangement, the two aerators are often at different elevations and there may be noticeable variations in airflow between them. This variation may be reduced by making the difference in elevation of the aerators 38 small in relation to the pressure behind the holes 50, for example by installing orifice plates 51 between the air delivery system 40 and each aerator 38. The variation may also be reduced by using separate down tubes 52 for each aerator 38 operated so that the aerators 38 are always at the same elevation. By using multiple aerators 38, the horizontal movement of each aerator 38 may be kept to 2 meters or less or to 1 meter or less. For example, an aerator 38 having a movement back and forth through the arc of a pendulum may be configured to have a maximum horizontal movement of about 2 meters and operated so that a single movement lasts for between about 10 seconds and about 60 seconds. Or an aerator 38 having a movement back and forth through the arc of a pendulum may be configured to have a maximum horizontal movement of about 1 meter and operated so that a single movement lasts for between about 10 seconds and about 30 seconds.

Referring to FIG. 5, where the various dimensions permit it, the membrane assembly 20 may be placed to one side of the tank 12. The space normally left in the tank 12 for a downcomer gives space for the aerator 38 to be rotated about the pivot 58 to a position above the membrane assembly 20 to facilitate operations ancillary to aeration such as periodically inspecting or washing the aerators 38.

Figure 6:
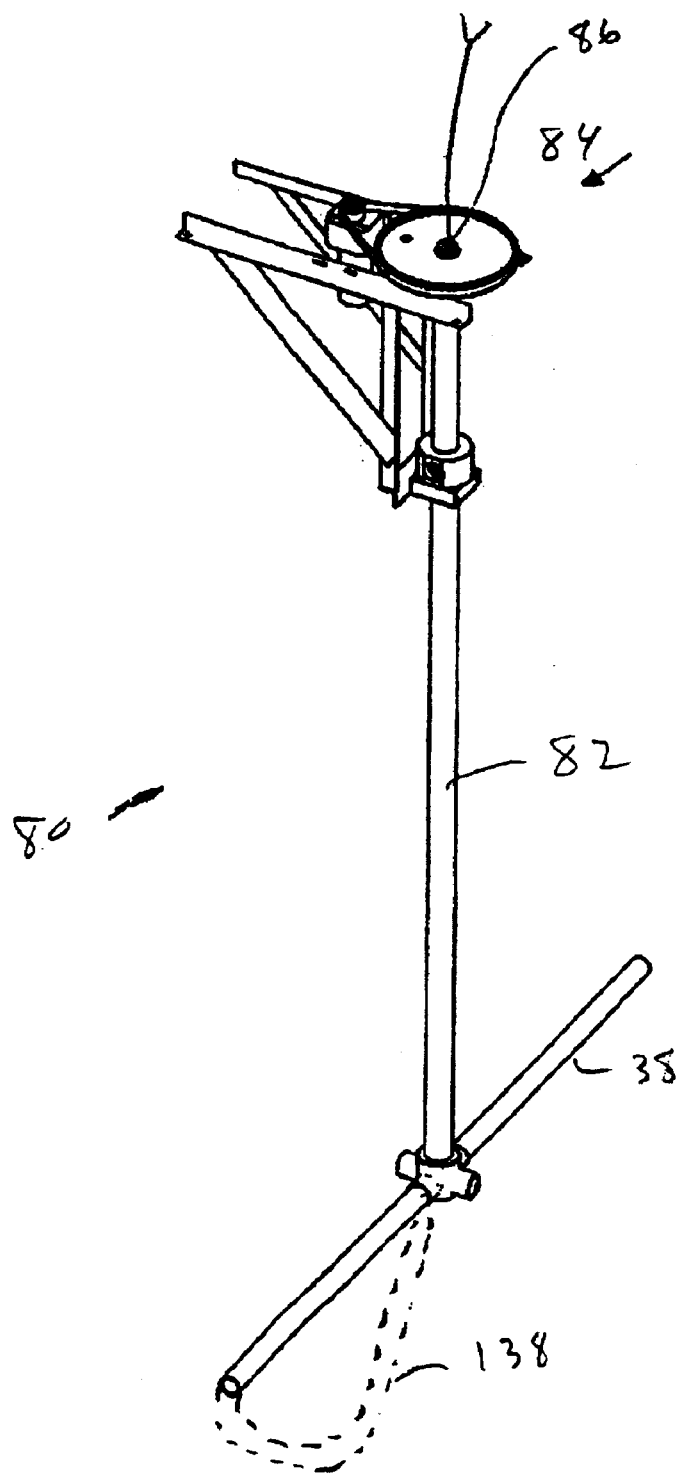
FIG. 6 is an isometric representation of another moving aerator.

The movement of the aerators 38 can also take various other forms. For example, the aerators 38 may be mounted on tracks below the membranes and moved in a horizontal back and forth motion. Referring to FIG. 6, an alternate mechanism 80 produces rotation of an aerator 38 in a generally horizontal plane about a generally vertical hollow rod 82. A driving mechanism 84 rotates the rod 82 from a position above the maximum height of the tank water 18. Air is supplied to the inside of the rod 82 through a rod inlet 86 fitted with seals to the end of the rod 82 and travels through the rod 82 to the aerator 38. The aerator 38 may have more holes at points away from the rod 82 or an alternate aerator 138 having spaced holes at parts away from the rod 82 may be used to account for differences in velocity at different points on the aerator 38. The alternate mechanism 80 is useful for cylindrical assemblies of membranes.

EXAMPLES

The tests described in the following examples used cassettes each made up of 24 elements of ZW-500c membranes. The elements and cassette frames were standard items produced by ZENON Environmental Inc. of Oakville, Ontario, Canada. Each element has a pair of opposed upper and lower rectangular headers with hollow fibre membranes suspended generally vertically between the headers and permeate withdrawn from the upper header only. The headers of each element are roughly 4 cm wide by 70 cm long and the height between headers is roughly 2 meters. The bundle of fibres of each element disperses in use to be about 60 mm wide and the elements are placed side by side with a space between adjacent fibre bundles of about 35 to 40 mm. The entire cassette is roughly 180 cm wide by 70 cm deep and 2 m high. 6 of the 24 elements were connected to permeate pumps while the remaining elements were not connected but remained in the cassette to simulate the hydrodynamics of a complete cassette. Moving aerators were set up with either one or two aerator tubes each producing a bubble plume of about 10 to 15 cm in width.

Example 1

Testing in Bentonite Solution

A cassette as described above was tested in a bentonite suspension of 3 g/L. Suction was increased as required to maintain a constant flux through the cassette. A fouling rate was measured as the rate of suction increase per minute to maintain the constant flux. The experiments were repeated at a variety of permeate fluxes.

For a benchmark, the cassette was tested with aeration cycled on and off in a repeated 20 second cycle. In the first half of the cycle, air was provided at 200 scfm for 10 seconds. In the second half of the cycle, the air was turned off for 10 seconds. Thus, the average airflow was 100 scfm. Fouling rates achieved at different fluxes are given in table 1 below.

For tests with a moving aerator, a single aerator tube was set up parallel to the long sides of the cassette and perpendicular to the elements as shown in FIG. 1. The aerator had 75 holes of 10 mm in diameter. The aerator moved through a horizontal distance of about 70 cm.

In one series of tests, the average airflow was 100 scfm and the motor driving the aerator was run at 6 rpm which gives a period of 10 seconds if the aerator is considered to be a pendulum. In another second series of tests, the average airflow was 100 scfm and the motor was run at 3 rpm, or a period of 20 seconds. Fouling rates achieved at different fluxes are given in Table 1 below under appropriate headings. At both speeds, the fouling rate was less than the baseline.

For further tests with a moving aerator, a double tube aerator was set up perpendicular to the long sides of the cassette and parallel to the elements as shown in FIG. 4B. The aerator tubes were spaced about 90 cm apart and each aerator tube moved through a horizontal distance of 90 mm such that each tube serviced about one half of the cassette. Each aerator tube had eight holes of 10 mm diameter each. The drive motor was operated at 2 rpm for a period of each aerator tube of 30 seconds. In a first series of tests, a total of 75 scfm was provided to the aerator tubes (37.5 scfm to each). As shown in Table 1, a significant reduction in fouling rate was achieved compared to the baseline even though the aeration rate was 25 scfm less. In a second series of tests, the aeration rate was further reduced to 50 scfm. The fouling rate was still less than for the baseline condition.

TABLE 1

FOULING RATE WITH VARIOUS TYPES OF AERATION AND VARIOUS FLUXES

|  | Permeate flux = 33 gfd | Permeate flux = 38 gfd | Permeate flux = 43 gfd |
| --- | --- | --- | --- |
| Benchmark - cyclic aeration, average airflow is 100 scfm | 0.211 psi/hr. | 0.468 psi/hr. | 1.125 psi/hr. |
| Single aerator perpendicular to elements with airflow of 100 scfm, 3 rpm | 0.0732 psi/hr. | 0.223 psi/hr. | 0.663 psi/hr. |
| Single aerator perpendicular to elements with airflow of 100 scfm, 6 rpm | 0.054 psi/hr. | 0.348 psi/hr. | 1.020 psi/hr. |
| Double aerator parallel to elements with airflow of 75 scfm, 2 rpm | 0.032 psi/hr. | 0.070 psi/hr. | 0/179 psi/hr. |
| Double aerator parallel to elements with airflow of 50 scfm, 2 rpm | 0.080 psi/hr. | 0.272 psi/hr. | 0.617 psi/hr. |

Example 2

Testing in Wastewater

In this test, a cassette as described above was operated in wastewater having a solids concentration of 20 g/L. The cassette was backwashed with permeate regularly. The membranes were also cleaned by backwashing with a chemical cleaner 3 times per week. Flux was maintained at 15 gfd. Permeabilities were measured after a stable permeability was reached.

In a first part of the test, the cassette was aerated in repeated cycles of 20 seconds. In each cycle, air was provided for 10 seconds at about 180 scfm and no air was provided for about 10 seconds resulting in an average air flow of about 90 scfm. Permeabilities varied within a range of between 6 and 6.5 gfd/psi.

In a second part of the test, the cassette was aerated with a moving aerator having two aerator tubes, each tube having 6 holes of 12 mm diameter in the bottom of the tube. The aerators were flooded with sludge twice a day for 5 minutes each time. The two aerators were set up to each service one half of the cassette as described in Example 1 above. The motor driving the aerators turned at 2 rpm such that each aerator tube moved through the arc of a pendulum with a period of 30 seconds. An orifice plate of 1 inch diameter was inserted upstream of both aerator tubes to reduce variations in airflow between them. During this part of the test, airflow to the aerators varied between 65 and 75 scfm. Despite the reduction in airflow compared to the benchmark, permeabilities remained between 6 and 6.5 gfd/psi.

Based on visual observation, the orifice plates were effective at reducing the variation in airflow between the two aerator tubes to an acceptable level throughout their travel. However, there was an unacceptable variation in airflow between the holes on a single tube. To reduce this variation to an acceptable level, the diameter of the 5 holes closest to where air entered the tubes were increased to about 16 mm and the diameter of the sixth hole was increased to about 19 mm. At the same time, the aerator flooding regime described above was stopped and the aerators were instead flushed with sludge every 12 hours at 52.5 gpm per tube for 90 seconds which essentially eliminated aerator hole fouling. Later, the arrangement of holes in the aerator tubes was changed again to 5 holes of 12 mm diameter and a sixth hole of about 15 mm diameter. The largest hole was located at the position furthest from the inlet of air to the aerator tube. The generally reduced size of the holes improved the distribution of airflow between the holes. The holes were also spread out further so that the first and last holes would be outside of the cassette boundary which assisted, based on visual inspection, in reducing sludge build up the sides of the cassette.

Embodiments similar to those described above can be made in many alternate configurations and operated according to many alternate methods within the teachings of the invention. The scope of the invention is defined by the following claims.

We claim:

1. An apparatus for aerating an assembly of immersed filtering membranes, comprising:
   one or more aerators for discharging bubbles wherein the one or more aerators move below a portion of the assembly of membranes to be aerated.

2. The apparatus of claim 1 wherein the one or more aerators are suspended from a pivot point above the one or more aerators and move through an arc of a pendulum.

3. The apparatus of claim 1 wherein the one or more aerators move in a generally horizontal back and forth motion.

4. The apparatus of claim 1 wherein the one or more aerators rotate in a generally horizontal plane about a generally vertical axis.

5. The apparatus of claim 1 wherein the one or more aerators have about 50 or less holes for discharging scouring bubbles per square meter of the horizontal area of the portion of the membrane assembly to be aerated.

6. The apparatus of claim 1 wherein the one or more aerators have about 25 or less holes for discharging scouring bubbles per square meter of the horizontal area of the portion of the membrane assembly to be aerated.

7. The apparatus of claim 2 wherein the one or more aerators may be rotated about their pivot point to a position above the membrane assembly to facilitate operations ancillary to aeration.

8. A process for aerating a portion of an assembly of immersed filtering membranes with scouring bubbles, comprising the steps of:
   (a) providing one or more aerators for discharging bubbles wherein the one or more aerators may be moved below a portion of the assembly of membranes to be aerated;
   (b) supplying a substantially continuous flow of gas through the one or more aerators to produce bubbles from the aerators; and,
   (c) moving the one or more aerators below the portion of the assembly of membranes to be aerated.

9. The process of claim 8 wherein the aerators produce scouring bubbles from holes and the air flow through each aerator hole is sufficient to substantially prevent tank water from creeping into the aerator.

10. The process of claim 8 wherein the one or more aerators are moved below a portion of the assembly of membranes to be aerated such that substantially every position within the horizontal area aerated by the one or more aerators is aerated.

11. The process of claim 8 wherein substantially every position within the horizontal area aerated by the one or more aerators is alternately aerated for a period of time and then not aerated for a period of time.

12. The process of claim 11 wherein the minimum aerated period of time for each position is about 0.5 seconds or more.

13. The process of claim 11 wherein the maximum non-aerated period of time for each position is about 60 seconds or less.

14. The process of claim 11 wherein the maximum non-aerated period of time for each position is between about 15 to 30 seconds.

15. The process of claim 11 wherein the minimum aerated period of time for each position is about 0.5 seconds or more and the maximum non-aerated period of time for each position is between about 15 to 30 seconds.

16. An apparatus for aerating an assembly of immersed filtering membranes, comprising:
   an aerator for discharging bubbles wherein the aerator moves below a portion of the assembly of membranes to be aerated through an arc of a pendulum
   wherein the horizontal length of the arc of the pendulum is 2 meters or less.

17. The apparatus of claim 16 wherein the horizontal length of the arc of the pendulum is 1 meter or less.

18. A process for aerating a portion of an assembly of immersed filtering membranes with scouring bubbles, comprising the steps of:
   (a) providing an apparatus as in claim 16;
   (b) supplying a substantially continuous flow of gas through the aerator to produce bubbles from the aerator; and
   (c) moving the aerator below an area of the assembly of membranes to be aerated in a repeated movement, the movement having a duration of between about 10 seconds and about 60 seconds.

19. A process for aerating a portion of an assembly of immersed filtering membranes with scouring bubbles, comprising the steps of:
   (a) providing an apparatus as in claim 17;
   (b) supplying a substantially continuous flow of gas through the aerator to produce bubbles from the aerator; and
   (c) moving the aerator below an area of the assembly of membranes to be aerated in a repeated movement, the movement having a duration of between about 10 seconds and about 30 seconds.

* * * * *